(12) United States Patent
Lin

(10) Patent No.: US 9,690,472 B2
(45) Date of Patent: Jun. 27, 2017

(54) DISPLAY METHOD AND ELECTRONIC DEVICE

(71) Applicant: Lenovo (Beijing) Co., Ltd., Beijing (CN)

(72) Inventor: Gaofeng Lin, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 215 days.

(21) Appl. No.: 14/086,453

(22) Filed: Nov. 21, 2013

(65) Prior Publication Data

US 2014/0149933 A1    May 29, 2014

(30) Foreign Application Priority Data

Nov. 27, 2012 (CN) .......................... 2012 1 0493155

(51) Int. Cl.
*G06F 3/048* (2013.01)
*G06F 3/0488* (2013.01)

(52) U.S. Cl.
CPC .................. *G06F 3/0488* (2013.01)

(58) Field of Classification Search
CPC ....................................... G06F 3/038
USPC ................................. 715/764, 810
See application file for complete search history.

(56) References Cited

U.S. PATENT DOCUMENTS

| 7,327,376 | B2 * | 2/2008 | Shen ........................ G06F 3/048 345/418 |
| 8,024,185 | B2 | 9/2011 | Do et al. |
| 8,451,216 | B2 | 5/2013 | Sakata et al. |
| 2005/0183023 | A1 | 8/2005 | Maruyama et al. |
| 2007/0294632 | A1 * | 12/2007 | Toyama .................. G06F 3/038 715/764 |
| 2008/0192059 | A1 | 8/2008 | Kennedy |
| 2010/0259473 | A1 | 10/2010 | Sakata et al. |
| 2012/0096390 | A1 | 4/2012 | Kwahk et al. |
| 2012/0110496 | A1 | 5/2012 | Lee et al. |

FOREIGN PATENT DOCUMENTS

| CN | 1655115 A | 8/2005 |
| CN | 101878487 A | 11/2010 |
| CN | 102460366 A | 5/2012 |
| CN | 102469211 A | 5/2012 |
| JP | 2008269044 A | 11/2008 |
| WO | WO-2012049199 A1 | 4/2012 |

OTHER PUBLICATIONS

First Chinese Office Action regarding Application No. 201210493155.4 dated May 4, 2016. English translation provided by Unitalen Attorneys at Law.

* cited by examiner

*Primary Examiner* — Matthew Ell
(74) *Attorney, Agent, or Firm* — Harness, Dickey & Pierce, P.L.C.

(57) ABSTRACT

The invention provides a display method for sharing information among various users. The method includes: detecting a first operation, where the first operation is associated with an object needed to be displayed; in response to the first operation, determining a first identifier from invoked usage information; displaying an interface needed to be displayed corresponding to the object needed to be displayed in a first display area corresponding to the first identifier. The invention further provides an electronic device to implement the method.

10 Claims, 1 Drawing Sheet

DISPLAY METHOD AND ELECTRONIC DEVICE

The present application claims the priority to Chinese Patent Application No. 201210493155.4, entitled as "DISPLAY METHOD AND ELECTRONIC DEVICE", filed on Nov. 27, 2012 with State Intellectual Property Office of People's Republic of China, the content of which is incorporated herein by reference in its entirety.

FIELD OF THE INVENTION

The invention relates to computer and embedded technologies, and in particular, to a display method and an electronic device.

BACKGROUND OF THE INVENTION

In the age of intelligence, people may easily feel changes on sense and operation caused by the touch panel: the interface for man-machine communication is friendlier, the operation is more convenient and the visual effect is better. As an emerging technology, the touch panel technology is now widely used in various industries; this technology is already well used in the mobile phones, cameras, computers, etc. and becomes popular in the field of industrial products unfamiliar to people.

Small display screens are now inadequate in many situations. For example, in the case that a plurality of users need to operate on a same electronic device simultaneously, obviously requirements of the users may not be satisfied if the display screen of the electronic device is small. Therefore, large display screens are produced accordingly and large touch panels are adopted in many situations.

In the process of implementing the technical solutions of embodiments of the disclosure, the inventor has found at least a technical problem in the prior art as follows:

in the case that a plurality of users utilize a large touch panel, information interaction may be necessary, for example, one user may intend to share corresponding information with another user, however, no appropriate solutions are provided in the prior art for the information interaction.

SUMMARY OF THE INVENTION

A display method and an electronic device are provided according to embodiments of the invention to solve the technical problem that information may not be shared among users in the prior art, the technical effect of sharing information among the users is achieved.

A display method applied in an electronic device, includes:
  detecting a first operation, where the first operation is associated with an object needed to be displayed;
  determining, in response to the first operation, a first identifier from invoked usage information; and
  displaying an interface needed to be displayed in a first display area corresponding to the first identifier, where the interface needed to be displayed corresponds to the object needed to be displayed.

In one embodiment of the present invention, the usage information may be a user information list storing user identifiers of respective users currently using the electronic device; alternatively, the usage information may be a display area usage information list storing active status of respective display sub-areas in the display area of the display unit of the electronic device; alternatively, the usage information may be a display area usage map storing active status of respective display sub-areas in the display area of the display unit of the electronic device.

In one embodiment of the present invention, before the step of determining, in response to the first operation, the first identifier from the invoked usage information, the method further includes a step of determining whether the first operation satisfies a first preset condition;

The step of determining, in response to the first operation, the first identifier from the invoked usage information includes: in the case that it is determined that the first operation satisfies the first preset condition, in response to the first operation, determining the first identifier from the invoked usage information.

In one embodiment of the present invention, before or after the step of detecting the first operation, the method further includes a step of invoking the usage information.

In one embodiment of the present invention, before the step of invoking the usage information, the method further includes a step of obtaining the usage information.

In one embodiment of the present invention, in the case that the usage information is the user information list, the step of obtaining the usage information includes: obtaining the user identifiers of the respective users currently using the electronic device based on login information of the users currently using the electronic device; generating the user information list based on all the user identifiers.

In one embodiment of the present invention, in the case that the usage information is the display area usage information list, the step of obtaining the usage information includes: obtaining the identifiers of activated display sub-areas in the display area based on display area usage situations of the respective users currently using the electronic device; generating the display area usage information list based on the obtained identifiers of the activated display sub-areas.

In one embodiment of the present invention, in the case that the usage information is the display area usage map, the step of obtaining the usage information includes: determining activated display sub-areas in the display area based on display area usage situations of the respective users currently using the electronic device; generating the display area usage map based on the determined activated display sub-areas and a display area map.

In one embodiment of the present invention, before the step of detecting the first operation, the method further includes:
  detecting a second operation, where the second operation is associated with the object needed to be displayed; and
  displaying, in response to the second operation, the interface needed to be displayed corresponding to the object needed to be displayed in a second display area, where the second display area is different from the first display area.

In one embodiment of the present invention, if the electronic device includes at least two operating systems, the object needed to be displayed is located in a first operating system and the first identifier is located in a second operating system, the step of displaying the interface needed to be displayed in the first display area corresponding to the first identifier includes:
  transmitting the object needed to be displayed from the first operating system to the second operating system;
  displaying, in the second operating system, the interface needed to be displayed in the first display area corresponding to the first identifier.

An electronic device, includes:
a detection module, configured to detect a first operation, where the first operation is associated with an object needed to be displayed;
a determination module, configured to determine, in response to the first operation, a first identifier from invoked usage information; and
a display module, configured to display an interface needed to be displayed in a first display area corresponding to the first identifier, where the interface needed to be displayed corresponds to the object needed to be displayed.

In one embodiment of the present invention, the usage information may be a user information list storing user identifiers of respective users currently using the electronic device; alternatively, the usage information may be a display area usage information list storing active status of respective display sub-areas in the display area of the display unit of the electronic device; alternatively, the usage information may be a display area usage map storing active status of respective display sub-areas in the display area of the display unit of the electronic device.

In one embodiment of the present invention, the electronic device further includes a judgment module configured to judge whether the first operation satisfies a first preset condition;

The judgment module may be configured to determine, in response to the first operation, the first identifier from the invoked usage information in the case that it is judged that the first operation satisfies the first preset condition.

In one embodiment of the present invention, the electronic device further includes an invoking module configured to invoke the usage information.

In one embodiment of the present invention, the electronic device further includes an obtaining module configured to obtain the usage information.

In one embodiment of the present invention, in the case that the usage information is the user information list, the obtaining module is configured to obtain the user identifiers of the respective users currently using the electronic device based on login information of the users currently using the electronic device, and generate the user information list based on all the user identifiers.

In one embodiment of the present invention, in the case that the usage information is the display area usage information list, the obtaining module is configured to obtain the identifiers of activated display sub-areas in the display area based on display area usage situations of the respective users currently using the electronic device, and generate the display area usage information list based on the obtained identifiers of the activated display sub-areas.

In one embodiment of the present invention, in the case that the usage information is the display area usage map, the obtaining module is configured to determine activated display sub-areas in the display area based on display area usage situations of the respective users currently using the electronic device, and generate the display area usage map based on the determined activated display sub-areas and a display area map.

In one embodiment of the present invention, the detection module is further configured to detect a second operation, where the second operation is associated with the object needed to be displayed;
the detection module is further configured to display, in response to the second operation, the interface needed to be displayed corresponding to the object needed to be displayed in a second display area, where the second display area is different from the first display area.

In one embodiment of the present invention, if the electronic device includes at least two operating systems, the object needed to be displayed is located in a first operating system and the first identifier is located in a second operating system, the display module further includes a transmission sub-module and a display sub-module;
the transmission sub-module is configured to transmit the object needed to be displayed from the first operating system to the second operating system;
the display sub-module is configured to display, in the second operating system, the interface needed to be displayed in the first display area corresponding to the first identifier.

The display method according to the embodiments of the invention may be adopted in the electronic device. The method may includes: detecting the first operation, where the first operation is associated with the object needed to be displayed; in response to the first operation, determining the first identifier from invoked usage information; displaying the object needed to be displayed in the first display area corresponding to the first identifier.

With the display method according to the embodiments of the invention, after determining the object needed to be displayed and the first identifier, the interface needed to be displayed corresponding to the object needed to be displayed may be displayed in the first display area corresponding to the first identifier. In the embodiments of the invention, the object needed to be displayed may be an icon object and the interface needed to be displayed may be a display interface corresponding to the icon object. With the technical solution according to the embodiments of the invention, the interface needed to be displayed may be displayed directly in the first display area corresponding to the first identifier, and since the first identifier corresponds to a user currently using the electronic device, it may be regarded that information is shared directly with the user, and the electronic device may display the information to be shared in the display area corresponding to the user. Hence, the information interaction is facilitated, the efficiency of information sharing is raised, the practicability of the electronic device is enhanced and the functions of the electronic device are enriched. The convenient information sharing among users is achieved, the operation for the user is simple and the user experience is improved.

DETAILED DESCRIPTION OF THE EMBODIMENTS

The display method according to embodiments of the invention is applicable in an electronic device, and the method includes: detecting a first operation, where the first operation is associated with an object needed to be displayed; in response to the first operation, determining a first identifier from invoked usage information; displaying an interface needed to be displayed in a first display area corresponding to the first identifier, where the interface needed to be displayed corresponds to the object needed to be displayed.

With the display method according to the embodiments of the invention, after determining the object needed to be displayed and the first identifier, the interface needed to be displayed corresponding to the object needed to be displayed may be displayed in the first display area corresponding to the first identifier. According to the embodiments of the invention, the object needed to be displayed may be an icon object and the interface needed to be displayed may be a display interface corresponding to the icon object. With the technical solution according to the embodiments of the invention, the interface needed to be displayed may be displayed directly in the first display area corresponding to the first identifier, and since the first identifier corresponds to a user currently using the electronic device, it may be regarded that information is shared directly with the user, and the electronic device may display the information to be shared in the display area corresponding to the user. Hence, the information interaction is facilitated, the efficiency of information sharing is raised, the practicability of the electronic device is enhanced and the functions of the electronic device are enriched. The convenient information sharing among users is achieved, the operation for the user is simple and the user experience is improved.

Figure 1:
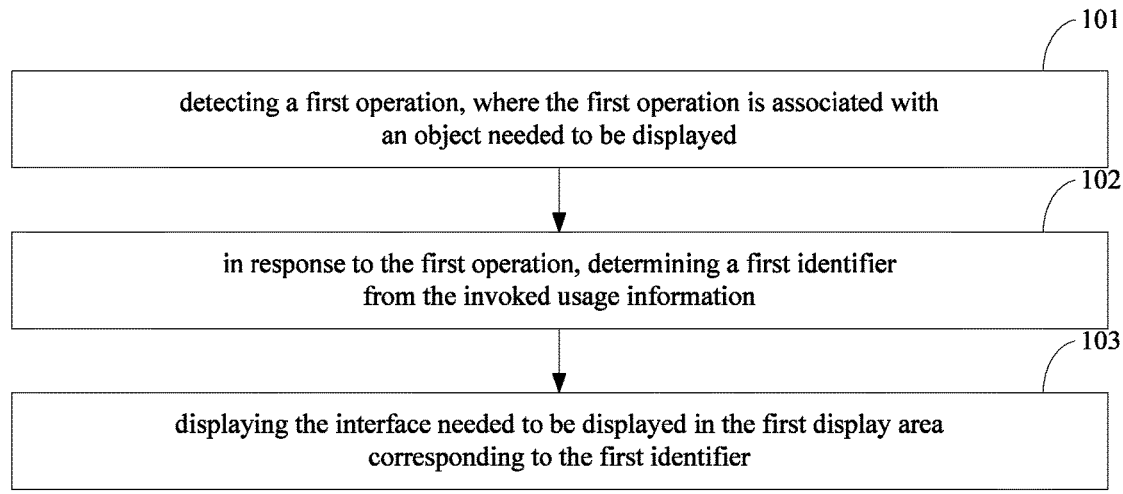
FIG. 1 is a flow chart of a display method according to embodiments of the invention.

Referring FIG. 1, the display method according to embodiments of the invention may be applied in an electronic device. The method includes the following steps 101-103.

Step 101: detecting a first operation, where the first operation is associated with an object needed to be displayed.

The electronic device may detect the first operation, where the first operation may correspond to the object needed to be displayed.

According to the embodiments of the invention, the first operation may be an operation of pressing a corresponding physical button; alternatively, if the electronic device includes a display module, the first operation may be an operation of dragging the object needed to be displayed to the edge of the display module; alternatively, the first operation may be any other operation.

According to the embodiments of the invention, before or after the step of detecting the first operation, usage information may be invoked.

Optionally, according to the embodiments of the invention, the usage information may be a user information list storing user identifiers of respective users currently using the electronic device.

Optionally, according to the embodiments of the invention, the usage information may be a display area usage information list storing active status of respective display sub-areas in the display area of the display unit of the electronic device.

Optionally, according to the embodiments of the invention, the usage information may be a display area usage map storing active status of respective display sub-areas in the display area of the display unit of the electronic device.

According to the embodiments of the invention, before invoking the usage information, the usage information may be obtained.

Optionally, according to the embodiments of the invention, in the case that the usage information is the user information list, the step of obtaining the usage information may include: obtaining the user identifiers of the respective users currently using the electronic device based on login information of the users currently using the electronic device; generating the user information list based on all the user identifiers.

Optionally, according to the embodiments of the invention, in the case that the usage information is the display area usage information list, the step of obtaining the usage information may include: obtaining the identifiers of activated display sub-areas in the display area based on display area usage situations of the respective users currently using the electronic device; generating the display area usage information list based on the obtained identifiers of the activated display sub-areas.

Optionally, according to the embodiments of the invention, in the case that the usage information is the display area usage map, the step of obtaining the usage information may include: determining activated display sub-areas in the display area based on display area usage situations of the respective users currently using the electronic device; generating the display area usage map based on the determined activated display sub-areas and a display area map.

Optionally, according to the embodiments of the invention, if only one operating system is installed in the electronic device, the interface needed to be displayed may be displayed directly in the first display area.

Optionally, according to the embodiments of the invention, if at least two operating systems are installed in the electronic device, the object needed to be displayed is located in a first operating system and the first identifier is associated with a second operating system, in order to display the interface needed to be displayed in the first display area corresponding to the first identifier, the object needed to be displayed should be transmitted from the first operating system to the second operating system; after the object needed to be displayed is transmitted from the first operating system to the second operating system, the interface needed to be displayed may be displayed in the first display area.

According to the embodiments of the invention, before the first operation is detected, the object needed to be displayed may be already opened, i.e., the object needed to be displayed may be presented as an already opened interface needed to be displayed. Supposing that only one operating system is installed in the electronic device, before the first operation is detected, the interface needed to be displayed is displayed in the second display area; after the interface needed to be displayed is displayed in the first display area, the displaying of the interface in the second display area may be continued or stopped, depending on whether an application associated with the object needed to be displayed is repeatable. For example, the Word program, an image program, etc. are repeatable applications, while some video players, e.g., the Storm Player, are unrepeatable applications.

According to the embodiments of the invention, before the first operation is detected, the object needed to be displayed may be already opened, i.e., the object needed to be displayed may be presented as an already opened interface needed to be displayed. Supposing that at least two operating systems are installed in the electronic device, before the first operation is detected, the interface needed to be displayed is displayed in the second display area under the first operating system; after the object needed to be displayed is transmitted to the second operating system, the interface needed to be displayed may be displayed in the first display area, and since the second operating system is in use and the first operating system may be exited, the displaying of the interface in the second display area may not be continued.

According to the embodiments of the invention, before the first operation is detected, the object needed to be displayed may be unopened, i.e., the object needed to be displayed may be only an icon. Supposing that only one operating system is installed in the electronic device, the interface needed to be displayed corresponding to the object needed to be displayed may be opened and displayed in the first display area.

According to the embodiments of the invention, before the first operation is detected, the object needed to be displayed may be unopened, i.e., the object needed to be displayed may be only an icon. Supposing that at least two operating systems are installed in the electronic device, the object needed to be displayed may be located in the first operating system initially; after transmitting the object needed to be displayed from the first operating system to the second operating system, the interface needed to be displayed corresponding to the object needed to be displayed may be opened and then displayed in the first display area.

According to the embodiments of the invention, the object needed to be displayed may be initially displayed in the first display area; after displaying the object needed to be displayed in the first display area, the user may be provided with an option such as a dialog box for the user to select whether to open the interface needed to be displayed corresponding to the object needed to be displayed; if the user selects to open the interface, the interface needed to be displayed may be opened and displayed in the first display area; after the interface is displayed in the first display area, displaying of the object in the first display area may be stopped.

Step 102: in response to the first operation, determining a first identifier from the invoked usage information.

According to the embodiments of the invention, after the first operation is detected, in response to the first operation, the first identifier may be determined from the invoked usage information.

According to the embodiments of the invention, the usage information may include at least one identifier and the first identifier may be determined from the at least one identifier.

According to the embodiments of the invention, before responding to the first operation, it may be determined whether the first operation satisfies a first preset condition.

According to the embodiments of the invention, the first operation may be the operation of pressing a corresponding physical button; alternatively, if the electronic device includes the display module, the first operation may be the operation of dragging the object needed to be displayed to the edge of the display module; alternatively, the first operation may further be any other operation.

Hence, according to the embodiments of the invention, the first preset condition may be that the corresponding physical button is pressed, the object needed to be displayed is dragged to the edge of the display module or the first preset condition may be any other condition.

According to the embodiments of the invention, if it is determined that the first operation satisfies the first preset condition, in response to the first operation, the first identifier may be determined from the invoked usage information.

Step 103: displaying the interface needed to be displayed in the first display area corresponding to the first identifier.

Optionally, according to the embodiments of the invention, before the first operation is detected, the object needed to be displayed may be unopened, i.e., the object needed to be displayed may be only an icon. Supposing that only one operation system is installed in the electronic device, the interface needed to be displayed corresponding to the object needed to be displayed may be opened and then displayed in the first display area.

Optionally, according to the embodiments of the invention, before the first operation is detected, the object needed to be displayed may be unopened, i.e., the object needed to be displayed may be only an icon. Supposing that at least two operating systems are installed in the electronic device and the object needed to be displayed is located in the first operating system initially, the object needed to be displayed may be firstly transmitted from the first operating system to the second operating system, and then the interface needed to be displayed corresponding to the object needed to be displayed may be opened and displayed in the first display area.

Optionally, according to the embodiments of the invention, the object needed to be displayed may be initially displayed in the first display area; after displaying the object needed to be displayed in the first display area, the user may be provided with an option such as a dialog box for the user to select whether to open the interface needed to be displayed corresponding to the object needed to be displayed; if the user selects to open the interface, the interface needed to be displayed may be opened and displayed in the first display area; after the interface is displayed in the first display area, displaying of the object in the first display area may be stopped.

Optionally, according to the embodiments of the invention, before displaying the interface needed to be displayed in the first display area, the user may be provided with an option such as a dialog box for the user to select whether to open the interface needed to be displayed corresponding to the object needed to be displayed; if the user selects to open the interface, the interface needed to be displayed may be opened and displayed in the first display area; and if the user selects not to open the interface, no operation is performed or the object needed to be displayed may be displayed in the first display area.

The display method is described in detail hereinafter in conjunction with several specific embodiments. Several possible application scenarios of the method are set forth according to the following embodiments. It should be noted that, the embodiments in the disclosure are intended to explain the invention, rather than to limit the invention. Any other embodiment in accordance with the spirit of the disclosure shall fall in the scope of the disclosure, and variations may be apparent to those skilled in the art based on the spirit of the disclosure.

Embodiment 1

The electronic device according to this embodiment may be a PAD with a large screen.

The electronic device may detect the first operation, where the first operation is associated with an object needed to be displayed.

According to the embodiment, the first operation may be the operation of pressing the corresponding physical button.

According to the embodiment, before the step of detecting the first operation, the usage information may be invoked.

According to the embodiment, the usage information may be the user information list storing the user identifiers of the respective users currently using the electronic device.

According to the embodiment, before invoking the usage information, the usage information may be obtained.

According to the embodiment, the usage information is the user information list, hence, the step of obtaining the usage information may include: obtaining the user identifiers of the respective users currently using the electronic device based on login information of the users currently using the electronic device; generating the user information list based on all the user identifiers.

According to the embodiment, after the first operation is detected, in response to the first operation, the first identifier may be determined from the invoked usage information.

According to the embodiment, the usage information includes at least one identifier and the first identifier may be determined from the at least one identifier. The usage information according to this embodiment is the user information list, hence, the first identifier may be determined from the user information list and the first identifier corresponds to a first user.

According to the embodiment, before the first operation is detected, the object needed to be displayed may be unopened, i.e., the object needed to be displayed may be an icon, and the interface needed to be displayed corresponding to the object needed to be displayed may be a video interface.

Only one operating system is installed in the electronic device according to this embodiment, the interface needed to be displayed corresponding to the object needed to be displayed may be opened and then displayed in the first display area, i.e., the video interface corresponding to the object needed to be displayed may be opened and then displayed in the first display area.

Embodiment 2

The electronic device according to this embodiment may be a PAD with a large screen.

The electronic device may detect the first operation, where the first operation is associated with the object needed to be displayed.

According to the embodiment, the first operation may be the operation of dragging the object needed to be displayed to the edge of the display module.

According to the embodiment, before the step of detecting the first operation, the usage information may be invoked.

According to the embodiment, the usage information may be the display area usage information list storing the active status of all the display sub-areas in the display area of the display unit of the electronic device.

According to the embodiment, before invoking the usage information, the usage information may be obtained.

According to this embodiment, the usage information is the display area usage information list, hence, the step of obtaining the usage information may include: obtaining the identifiers of the activated display sub-areas in the display area based on the display area usage situations of the respective users currently using the electronic device; generating the display area usage information list based on the obtained identifiers of the activated display sub-areas.

According to the embodiment, after the first operation is detected, it may be determined whether the first operation satisfies the first preset condition.

According to the embodiment, the first preset condition may be that the object needed to be displayed is dragged to the edge of the display module, then it is determined that the first operation satisfies the first preset condition.

Since it is determined that the first operation satisfies the first preset condition, in response to the first operation, the first identifier may be determined from the invoked usage information.

According to the embodiment, the usage information includes at least one identifier and the first identifier may be determined from the at least one identifier. The usage information according to the embodiment is the display area usage information list, hence, the first identifier may be determined from the display area usage information list, where the first identifier corresponds to one display sub-area and the display sub-area corresponds to a first user.

According to the embodiment, before the first operation is detected, the object needed to be displayed may be already opened, i.e., the object needed to be displayed may be presented as an opened interface needed to be displayed. Supposing that at least two operating systems are installed in the electronic device, before the first operation is detected, the interface needed to be displayed is displayed in the second display area under the first operating system; after transmitting the object needed to be displayed to the second operating system, the interface needed to be displayed may be displayed in the first display area, and since the second operating system is in use and the first operating system is exited, the displaying of the interface in the second display area may not be continued.

According to this embodiment, the object needed to be displayed may be initially displayed in the first display area; after displaying the object needed to be displayed in the first display area, the user may be provided with an option such as a dialog box for the user to select whether to open the interface needed to be displayed corresponding to the object needed to be displayed; if the user selects to open the interface, the interface needed to be displayed may be opened and displayed in the first display area; after the interface is displayed in the first display area, displaying of the object in the first display area may be stopped.

Embodiment 3

The electronic device according to this embodiment may be a PAD with a large screen.

The electronic device may detect the first operation, where the first operation is associated with the object needed to be displayed.

According to the embodiment, the first operation may be the operation of dragging the object needed to be displayed to the edge of the display module.

According to the embodiment, before the step of detecting the first operation, the usage information may be invoked.

According to the embodiment, the usage information may be the display area usage map storing the active status of respective display sub-areas in the display area of the display unit of the electronic device.

According to the embodiment, before invoking the usage information, the usage information may be obtained.

According to the embodiment, the usage information is the display area usage map, hence, the step of obtaining the usage information may include: determining the activated display sub-areas in the display area based on the display area usage situations of the respective users currently using the electronic device; generating the display area usage map based on the determined activated display sub-areas and the display area map.

According to the embodiment, after the first operation is detected, it may be determined whether the first operation satisfies the first preset condition.

According to the embodiment, the first preset condition may be that the object needed to be displayed is dragged to the edge of the display module, and then it is determined that the first operation satisfies the first preset condition.

Since it is determined that the first operation satisfies the first preset condition, in response to the first operation, the first identifier may be determined from the invoked usage information.

According to the embodiment, the usage information includes at least one identifier and the first identifier may be determined from the at least one identifier. The usage information according to the embodiment is the display area usage map, hence, the first identifier may be determined from the display area usage map, where the first identifier corresponds to one display sub-area, the display sub-area corresponds to a first user.

According to the embodiment, before the first operation is detected, the object needed to be displayed may be already opened, i.e., the object needed to be displayed may be presented as an opened interface needed to be displayed. Supposing that only one operating system is installed in the electronic device, before the first operation is detected, the interface needed to be displayed is displayed in the second display area; after the interface needed to be displayed is displayed in the first display area, the displaying of the interface in the second display area may be continued or stopped, depending on whether an application associated with the object needed to be displayed is repeatable. For example, the Word program, an image program, etc. are repeatable applications, while some video players, e.g., the Storm Player, are unrepeatable applications.

According to this embodiment, the application corresponding to the object needed to be displayed is the Word program and is repeatable; therefore, the displaying of the interface in the second display area may be continued after the interface is displayed in the first display area.

According to the embodiment, before displaying the object needed to be displayed in the first display area, the user may be provided with an option such as a dialog box for the user to select whether to open the interface needed to be displayed corresponding to the object needed to be displayed; if the user selects to open the interface, the interface needed to be displayed may be opened and displayed in the first display area; and if the user selects not to open the interface, no operation is performed or the object needed to be displayed may be displayed in the first display area.

Figure 2:
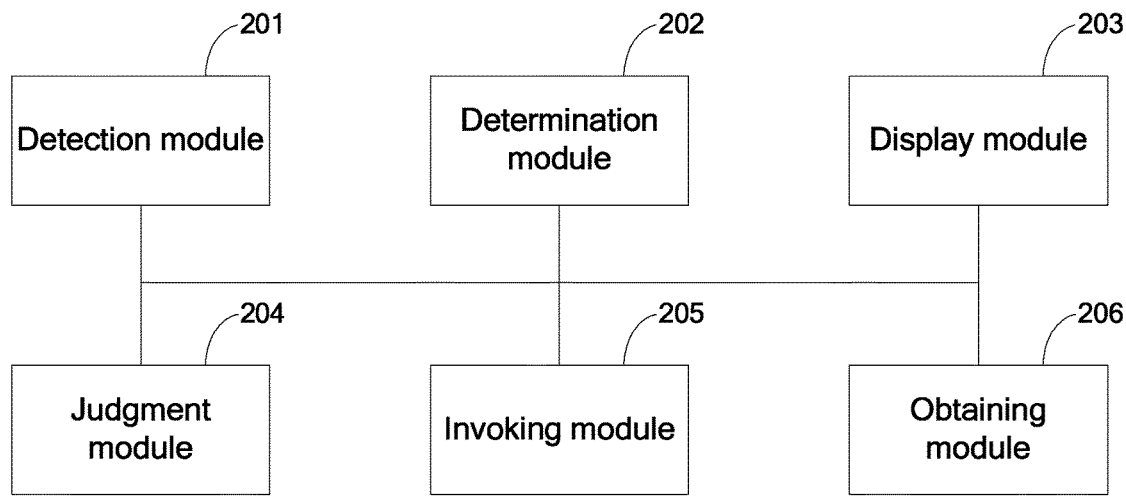
FIG. 2 is a structure diagram of an electronic device according to embodiments of the invention.

Referring FIG. 2, an electronic device is further provided according to an embodiment of the invention. The electronic device may include a detection module 201, a determination module 202 and a display module 203.

In one embodiment of the present invention, the electronic device may further include a judgment module 204, an invoking module 205 and an obtaining module 206.

The detection module 201 may be configured to detect a first operation, where the first operation is associated with an object needed to be displayed.

The detection module 201 may further be configured to detect a second operation, where the second operation is associated with the object needed to be displayed.

The determination module 202 may be configured to in response to the first operation, determine a first identifier from invoked usage information.

The determination module 202 may be configured to, in the case that it is determined that the first operation satisfies the first preset condition, in response to the first operation, determine the first identifier from the invoked usage information.

The display module 203 may be configured to display an interface needed to be displayed in a first display area corresponding to the first identifier, where the interface needed to be displayed corresponds to the object needed to be displayed.

The display module 203 may further be configured to in response to the second operation, display the interface needed to be displayed corresponding to the object needed to be displayed in a second display area, where the second display area is different from the first display area.

According to the embodiment, if at least two operating systems are installed in the electronic device, the object needed to be displayed is located in a first operating system and the first identifier is located in the second operating system, the display module 203 may further include a transmission sub-module and a display sub-module.

The transmission sub-module is configured to transmit the object needed to be displayed from the first operating system to the second operating system.

The display sub-module is configured to display, in the second operating system, the interface needed to be displayed corresponding to the object needed to be displayed in the first display area corresponding to the first identifier.

According to the embodiment, the usage information may be a user information list storing user identifiers of respective users currently using the electronic device; alternatively, the usage information may be a display area usage information list storing active status of respective display sub-areas in the display area of the display unit of the electronic device; alternatively, the usage information may be a display area usage map storing active status of respective display sub-areas in the display area of the display unit of the electronic device.

The judgment module 204 may be configured to judge whether the first operation satisfies the first preset condition.

The invoking module 205 may be configured to invoke the usage information.

The obtaining module 206 may be configured to obtain the usage information.

According to the embodiment, in the case that the usage information is the user information list, the obtaining module 206 may be configured to obtain the user identifiers of the respective users currently using the electronic device based on login information of the users currently using the electronic device and generate the user information list based on all the user identifiers.

According to the embodiment, in the case that the usage information is the display area usage information list, the obtaining module 206 may be configured to obtain the identifiers of activated display sub-areas in the display area based on display area usage situations of the respective users currently using the electronic device and generate the display area usage information list based on the obtained identifiers of the activated display sub-areas.

According to the embodiment, in the case that the usage information is the display area usage map, the obtaining module 206 may be configured to determine activated display sub-areas in the display area based on display area usage situations of the respective users currently using the electronic device and generate the display area usage map based on the determined activated display sub-areas and a display area map.

The display method according to the embodiments may be applied in the electronic device, where the method may include: detecting the first operation, where the first operation is associated with the object needed to be displayed; in response to the first operation, determining the first identifier from the invoked usage information; displaying the interface needed to be displayed in the first display area corresponding to the first identifier.

With the display method according to the embodiments of the invention, after determining the object needed to be displayed and the first identifier, the interface needed to be displayed corresponding to the object needed to be displayed may be displayed in the first display area corresponding to the first identifier. In the embodiments of the invention, the object needed to be displayed may be an icon object and the interface needed to be displayed may be a display interface corresponding to the icon object. With the technical solution according to the embodiments of the invention, the interface needed to be displayed may be displayed directly in the first display area corresponding to the first identifier, and since the first identifier corresponds to a user currently using the electronic device, it may be regarded that information is shared directly with the user, and the electronic device may display the information to be shared in the display area corresponding to the user. Hence, the information interaction is facilitated, the efficiency of information sharing is raised, the practicability of the electronic device is enhanced and the functions of the electronic device are enriched. The convenient information sharing among users is achieved, the operation for the user is simple and the user experience is improved.

According to the embodiments, the usage information may be various information for indicating the users of the electronic device in various manners and various usage information may be obtained as required; nevertheless, the flexible technical solutions of the invention are applicable for various usage information.

According to the embodiments, the interface needed to be displayed may be displayed in the first display area after being opened. For example, a first user may share a valuable content to a second user when viewing the valuable content, and it is guaranteed that the content displayed in the interface needed to be displayed is viewed by the second user. Alternatively, the interface needed to be displayed may be displayed directly in the first display area before being opened, and in this case the first user may share the object needed to be displayed to the second user without opening the corresponding interface needed to be displayed, the operation is convenient.

It should be understood by those skilled in the art that, the embodiments according to the present disclosure may be implemented as a method, system or computer program product. Hence, the embodiments of the invention may be implemented with hardware only, with software only, or with a combination of hardware and software. Furthermore, the embodiments of the present disclosure may be implemented in computer program products in the form of computer readable media (including but not limited to magnetic disk storages, optical storages, etc.) storing computer executable codes.

The description in this disclosure is made in conjunction with flowchart(s) and/or block diagram(s) of the method, device (system) or computer program product according to the embodiments of the disclosure. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to achieve a machine, in which device(s) to implement functions specified in one or more processes of the flowchart and/or one or more blocks of the block diagram is (are) achieved through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart and/or one or more blocks of the block diagram.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Obviously, various changes and modifications can be performed on the disclosure by those skilled in the art without departing from the spirit and scope of the disclosure. The invention intends to include those changes and modifications within the scope of the claims of the invention and equivalents thereof.

The invention claimed is:

1. A display method applied in an electronic device including at least two operating systems, the display method comprising:
   detecting a first operation associated with an object to be displayed, wherein the object is located in a first operating system;
   in response to the first operation, displaying, in a first display area, an interface to be displayed that corresponds to the object;
   detecting a second operation associated with the object, wherein the second operation includes an operation of dragging the object to an edge of the first display area;
   in response to the second operation, determining from active display sub-areas a second display area corresponding to an identifier determined based on invoked usage information, wherein the identifier is located in a second operating system;
   displaying the object in the second display area, wherein the object is an icon;
   displaying the interface in the second display area in response to a user's selection operation; and
   stopping displaying the interface in the first display area, in response to displaying the interface in the second display area,
   wherein the usage information comprises a display area usage information list for storing identifiers of the active display sub-areas,
   wherein the identifiers of the active display sub-areas include the identifier,
   wherein the step of displaying the interface in the second display area comprises:
      transmitting the object from the first operating system to the second operating system; and
      displaying the interface in the second operating system; and wherein the method further comprises:
obtaining the identifiers of the activated display sub-areas based on display area usage situations of respective users currently using the electronic device; and
generating the display area usage information list based on the identifiers of the activated display sub-areas.

2. The method according to claim 1, wherein the usage information further comprises a user information list storing user identifiers of the users.

3. The method according to claim 2, wherein before or after the step of detecting the second operation, the method further comprises a step of invoking the usage information.

4. The method according to claim 2, wherein the method further comprises:
obtaining the user identifiers of the users based on login information of the users; and
generating the user information list based on all the user identifiers.

5. The method according to claim 1, further comprising:
determining whether the second operation satisfies a first preset condition; and
in the case that it is determined that the second operation satisfies the first preset condition, in response to the second operation, determining the identifier from the invoked usage information.

6. An electronic device with at least two operating systems comprising:
one or more processors; and
a memory storing program instructions which, when executed by the one or more processors, configure the electronic device to:
detect a first operation associated with an object be displayed, wherein the object is located in a first operating system;
in response to the first operation, display, in a first display area, an interface to be displayed that corresponds to the object;
detect a second operation associated with the object, wherein the second operation includes an operation of dragging the object to an edge of the first display area;
in response to the second operation, determining from active display sub-areas, a second display area corresponding to an identifier determined based on invoked usage information, wherein the identifier is located in a second operating system;
displaying the object in the second display area, wherein the object is an icon;
display the interface in the second display area in response to a user's selection operation; and
stopping displaying the interface in the first display area, in response to displaying the interface in the second display area,
wherein the usage information comprises a display area usage information list for storing identifiers of the active display sub-areas,
wherein the identifiers of the active display sub-areas include the identifier,
wherein displaying the interface in the second display area comprises:
transmitting the object from the first operating system to the second operating system; and
displaying the interface in the second operating system; and
wherein the electronic device is further configured to:
obtain the identifiers of the activated display sub-areas based on display area usage situations of respective users currently using the electronic device; and
generate the display area usage information list based on the identifiers of the activated display sub-areas.

7. The electronic device according to claim 6, wherein the usage information further comprises a user information list storing user identifiers of the users.

8. The electronic device according to claim 7, wherein the electronic device is further configured to invoke the usage information before or after detecting the second operation.

9. The electronic device according to claim 7, wherein the electronic device is further configured to:
obtain the user identifiers of the users based on login information of the users; and
generate the user information list based on all the user identifiers.

10. The electronic device according to claim 6, wherein the electronic device is further configured to:
determine whether the second operation satisfies a first preset condition; and
in the case that it is determined that the second operation satisfies the first preset condition, in response to the second operation, determining the identifier from the invoked usage information.

* * * * *